US006931856B2

(12) United States Patent
Belokon et al.

(10) Patent No.: US 6,931,856 B2
(45) Date of Patent: Aug. 23, 2005

(54) MULTI-SPOOL TURBOGENERATOR SYSTEM AND CONTROL METHOD

(75) Inventors: Alexander A. Belokon, Moscow (RU); Mikhail V. Senkevich, Moscow (RU); George L. Touchton, Newark, CA (US)

(73) Assignee: MES International, Inc., Asheville, NC (US)

( * ) Notice: Subject to any disclaimer, the term of this patent is extended or adjusted under 35 U.S.C. 154(b) by 12 days.

(21) Appl. No.: 10/661,849

(22) Filed: Sep. 12, 2003

(65) Prior Publication Data

US 2005/0056021 A1 Mar. 17, 2005

(51) Int. Cl.[7] .............................. F02B 43/00; F02C 7/10
(52) U.S. Cl. ....................... 60/772; 60/773; 60/39.12; 60/39.511
(58) Field of Search ...................... 60/772, 773, 39.511, 60/39.12, 734

(56) References Cited

U.S. PATENT DOCUMENTS

| | | | | |
|---|---|---|---|---|
| 3,242,347 A | * | 3/1966 | Dotson ......................... | 60/773 |
| 4,270,344 A | | 6/1981 | Yu | |
| 5,689,141 A | | 11/1997 | Kikkawa et al. .............. | 290/52 |
| 5,718,112 A | * | 2/1998 | Dodge et al. .............. | 60/39.12 |
| 5,799,484 A | * | 9/1998 | Nims ....................... | 60/39.511 |
| 5,826,673 A | | 10/1998 | Bates et al. | |
| 6,066,898 A | | 5/2000 | Jensen .......................... | 290/52 |
| 6,073,857 A | * | 6/2000 | Gordon et al. .............. | 237/12.1 |
| 6,199,366 B1 | * | 3/2001 | Murata et al. ................ | 60/785 |
| 6,244,034 B1 | * | 6/2001 | Taylor et al. ............ | 60/39.511 |
| 6,313,544 B1 | * | 11/2001 | Mongia et al. ............... | 290/52 |
| 6,526,757 B2 | * | 3/2003 | Mackay ....................... | 60/773 |
| 6,606,864 B2 | * | 8/2003 | MacKay ....................... | 60/773 |
| 6,666,027 B1 | * | 12/2003 | Cardenas, Jr. ............... | 60/772 |
| 2003/0126864 A1 | | 7/2003 | Thompson ................... | 60/774 |
| 2004/0035117 A1 | * | 2/2004 | Rosen ......................... | 60/772 |

OTHER PUBLICATIONS

Copy of International Search Report for PCT Application No. PCT/US2004/029424; Filed Sep. 9, 2004; Date of Completion Dec. 7, 2004; Date of Mailing Dec. 16, 2004.

* cited by examiner

*Primary Examiner*—Thai-Ba Trieu
(74) *Attorney, Agent, or Firm*—Alston & Bird LLP

(57) ABSTRACT

An electrical power generating system is driven by a multi-spool gas turbine engine including at least first and second spools. The first spool comprises a turbine and a compressor mounted on a first shaft; the second spool has at least a turbine mounted on a second shaft that is not mechanically coupled to the first shaft. A main generator is coupled with one of the spools, and an auxiliary generator/motor is also coupled with one of the spools. Speed control of each of the generators is employed for controlling operation of the engine. The auxiliary generator/motor can operate in either a generation mode to extract power from its spool or a motor mode to inject power into its spool.

29 Claims, 10 Drawing Sheets

MULTI-SPOOL TURBOGENERATOR SYSTEM AND CONTROL METHOD

FIELD OF THE INVENTION

This invention relates to the generation of electrical power from mechanical power produced by a multi-spool turbine engine.

BACKGROUND OF THE INVENTION

Distributed power generation is a concept that has been the subject of much discussion over the years, but to date there has not been widespread deployment of distributed generation systems. Distributed generation refers to the use of small electrical power generation systems located at the sites where the power is needed, and thus is to be distinguished from the traditional utility grid system in which a large central power plant produces power that is then transmitted over substantial distances to a plurality of users through a system of power transmission lines commonly referred to as a grid. In contrast to conventional power plants operated by utilities, which often can produce several megawatts of power, distributed generation systems are generally sized below two megawatts, and more typically in the 60 to 600 kilowatt range.

The failure of distributed generation to achieve widespread deployment can be attributed primarily to cost. In most areas of the United States, and indeed in much of the world, it simply has been cheaper for most users to purchase power from the grid than to invest in and operate a distributed generation system. A major factor driving the relatively high cost of power from distributed generation systems has been the relatively low efficiency of the small engines used in such systems, particularly at part-load operation conditions.

Typically, the generator in a distributed generation system is driven by a small turbine engine, often referred to as a microturbine or miniturbine depending on size. A turbine engine generally comprises a combustor for burning a fuel and air mixture to produce hot gases by converting the chemical energy of the fuel into heat energy, a turbine that expands the hot gases to rotate a shaft on which the turbine is mounted, and a compressor mounted on or coupled with the shaft and operable to compress the air that is supplied to the combustor. Multi-spool turbine engines are also employed in some applications. For example, a twin-spool engine of the turbocharged type includes a low-pressure spool comprising a shaft on which a low-pressure turbine (LPT) and low-pressure compressor (LPC) are mounted, and a high-pressure spool comprising another shaft on which a high-pressure turbine (HPT) and high-pressure compressor (HPC) are mounted. The working fluid pressurized by the LPC is fed into the HPC where it is further compressed before being fed to the combustor. The combustion gases pass first through the HPT and then through the LPT. A main generator is mounted on the high-pressure shaft. Such twin-spool engines can increase the power available from the high-pressure shaft by a factor of 1.5 to 2.0 relative to a single-spool engine at the same turbine inlet temperature. In other multi-spool engines for power generation, one shaft supports a compressor and turbine to form a gas generator or "gasifier" and the other shaft supports a free power turbine that is fed by the exhaust from the gasifier. The generator is mounted on the power turbine shaft.

Because of the relatively small amount of electrical power required from a distributed generation system, the turbine engine is correspondingly small. For reasons relating to the aerodynamics that take place within the engine, and other reasons, the efficiency of a turbine engine tends to decrease with decreasing engine size. Accordingly, microturbines and miniturbines automatically have an efficiency disadvantage relative to larger engines.

Furthermore, irrespective of size, the part-load efficiency of a turbine engine is notoriously poor, in part because of the particular manner in which the engine is operated at part-load conditions. More particularly, it is typically the case in turbine engines that the high-pressure turbine inlet temperature, which essentially represents the peak temperature of the working fluid in the engine cycle, falls as the power output from the engine decreases below the "design" point. The design point is typically a 100 percent rated load condition, and the engine is usually designed so that its peak efficiency occurs substantially at the design point. It is well known that the primary variable influencing the efficiency of the thermodynamic cycle of an engine is the peak temperature of the working fluid. All other things being equal, the greater the peak temperature, the greater the efficiency; conversely, the lower the peak temperature, the lower the efficiency. Therefore, if the engine, when operating at a part-load condition, is controlled in such a manner that the peak effective temperature of the working fluid in the cycle (i.e., the turbine inlet temperature) is substantially lower than what it is at the design point, the efficiency of the engine tends to suffer to a substantial extent.

In some prior-art gas turbines, particularly aircraft gas turbine engines for propulsion and large gas turbines for constant-speed electrical generator systems, variable-geometry systems have been used at part-load conditions to reduce the air flow rate so that engine efficiency does not unduly suffer. For instance, variable inlet guide vanes (IGVs) have been used in axial-flow compressors; at part-load conditions, the IGVs are closed down to reduce the air flow rate for a given compressor speed. In the case of radial compressors, the inlet stator vanes have sometimes been made variable for achieving a similar effect. In still other cases, variable first-stage turbine vanes or nozzles have been employed for controlling the speed of the turbine and, hence, the speed of the compressor, so as to control air flow rate. Such variable-geometry systems are expensive, and the bearings and other movable components are prone to wear, thus making these systems impractical for electrical generation systems that must be available for service for a high percentage of hours per year, must be able to operate essentially continuously if required, and must also be able to respond quickly to changes in the power required by the load being served. Furthermore, variable-geometry mechanisms are not practical to implement in microturbines and miniturbines because of the small size of the engine. Thus, a need exists for an alternative to variable-geometry methods for optimizing engine performance at part-load conditions.

Emissions (including but not limited to nitrogen oxides, unburned hydrocarbons, and carbon monoxide) represent another aspect of distributed generation that has proven challenging. In general, for a given power output, $NO_x$ emissions tend to be reduced or minimized by minimizing the temperature of combustion of the fuel (also known as the flame temperature), which in general is higher than the peak thermodynamic temperature (turbine inlet temperature), thus reducing the production of oxides of nitrogen without adversely affecting efficiency. The primary method of reducing the flame temperature is to premix the fuel and air prior to the combustion zone to produce a mixture with a low relative ratio of fuel to air, i.e., a lean mixture. The premixing also assures that the temperature throughout the flame zone is very nearly uniform without hot spots that can lead to the local production of NOx. However, as the mixture is made leaner, carbon monoxide (CO), unburned hydrocarbon (UTHC), and pressure fluctuations increase. These trends continue and the flame zone becomes more unstable as the mixture is made still leaner, until the lean extinction limit is reached. For mixtures any leaner than this limit, no flame can be sustained. In practice, carbon monoxide and unburned hydrocarbon emissions and/or pressure pulsations become unacceptably high before the lean extinction limit is reached.

The lean extinction limit may be moved to leaner regimes by increasing the inlet temperature to the combustor and by using catalytic combustion. The use of catalytic combustion substantially increases the operating regime for lean pre-mixed combustion, resulting in very low $NO_x$ emission, acceptable CO and UHC emissions, and essentially no pressure pulsations. Catalytic combustion does, however, introduce another constraint on operation called the lower catalytic activity limit. The inlet temperature to the catalytic combustor must be kept above this limit to sustain catalytic combustion.

In many conventional microturbines, the engine control is such that at part-load conditions the combustor inlet temperature tends to fall and the fuel/air mixture becomes leaner. In the case of conventional lean pre-mixed combustion, this tends to result in increased emissions; in the case of catalytic combustion, the falling combustor inlet temperature can lead to failure to sustain catalytic combustion. In practice, lean-premixed and catalytic combustors are able to operate over only a portion of the load range of the gas turbine because of falling combustor inlet temperatures and the progressively leaner conditions that prevail as load is decreased.

In some cases, pre-burners have been used before combustors for boosting the combustor inlet temperature. Additionally, variable-geometry combustors have been used in which a portion of the air is diverted around the combustor to maintain the fuel/air ratio at a level allowing operational stability. The pre-burner solution poses a reliability penalty in that over-temperature or other malfunction of the pre-burner can damage the main burner, and also adds to the cost of the system. In addition, it imposes an operating cost penalty as a result of the pressure loss that occurs through the pre-burner; this pressure loss is experienced even when the pre-burner is not in use. Variable geometry can be applied to eliminate the pressure loss penalty in addition to its use in maintaining fuel/air ratio. However, variable geometry solutions are costly, complicated, and prone to excessive wear, decreasing reliability and increasing maintenance costs.

As noted, twin-spool engines have an advantage in terms of higher power output, but they also further complicate the control of the engine, particularly when (as desirable) there is no mechanical link between the two shafts so that all control must be achieved by regulation of the flow. Twin-spool engines have been developed for automotive applications wherein a mechanical linkage exists between the two shafts. Such engines generally require a complicated mechanical clutch and gear train between the shafts. Such mechanisms are costly to manufacture, prone to wear, and have high losses. They are generally unsuitable for power generation applications where operating lives of 60,000 hours or more without maintenance are desirable.

For many potential users, these factors have combined to make electrical power generation via distributed generation systems less attractive than purchasing power from the large utilities.

SUMMARY OF THE INVENTION

The present invention addresses the above needs and achieves other advantages, by providing an electrical power generating system and method employing a multi-spool engine, wherein at any operating condition, for a given power output the engine efficiency can be substantially optimized by controlling the rate of air flow through the engine in such a manner that the fuel/air ratio is controlled to maintain a high peak temperature imparted to the working fluid in the engine. The method and system of the invention can eliminate the need for variable-geometry mechanisms in the engine, eliminate the need for variable-geometry combustors, and also minimize or eliminate the need for pre-burners.

In accordance with a method aspect of the invention, a method is provided for controlling operation of a twin-spool turbine engine in an electrical generator system. The system has a first shaft on which a first turbine and a first compressor are mounted to form a first spool or gasifier spool. The first spool includes a combustor for combusting or reacting an air/fuel mixture to produce hot gases that drive the first turbine. The system also includes a second shaft on which at least a second turbine is mounted to form a second spool that is rotatable independently of the first spool (i.e., there is no mechanical linkage between the spools). Exhaust gases from the first turbine are fed to the second turbine, which drives the second spool. A main electrical generator is coupled to one of the shafts such that rotation of the shaft causes the main generator to operate to create an alternating electrical current; a change in speed of the main generator causes a corresponding change in speed of the shaft and hence a change in rate of air flow through the compressor on that shaft. An auxiliary generator/motor is coupled to the other of the shafts. In a generation mode, the auxiliary generator/motor is driven by its shaft to extract power from the shaft and produce electrical power; in a motor mode, the auxiliary generator/motor is supplied with electrical power and injects mechanical power into its shaft. The power extraction/injection capability of the auxiliary generator/motor is used to achieve various desirable effects in the engine system, including speed control for the shaft on which the generator/motor is mounted. Through such speed control for the spool on which the generator/motor is mounted, the air flow rate through the associated compressor and/or the pressure ratio of the compressor can be controlled at any operating condition, thereby providing control over the operating line for the compressor. The operating line is the line on the pressure ratio-versus-flow graph for the compressor (referred to as the compressor "map") along which the compressor operates with changing turbine power output. The location of the operating line on the map in general is a function of the ambient temperature. The control over the operating line provided by the invention can be used to achieve one or more effects, which include optimizing the efficiency of the engine at any operating condition, and/or avoiding a surge region of a compressor map, and/or preventing over-heating of a recuperator included in the engine system, and/or maintaining a catalytic combustor inlet temperature above a catalyst minimum operating temperature. In addition, the generator/motor can rotatably drive the shaft on which it is mounted during start-up so as to serve as a starter so that a separate starter can be omitted.

The method comprises the steps of operating the engine, and controlling the speed of the main generator so as to control air flow rate through the spool to which the main generator is coupled and thereby control speed and air flow rate of the spool, and operating the auxiliary generator/motor in either the generation mode or the motor mode so as to respectively extract power from or inject power into the spool to which the auxiliary generator/motor is coupled and thereby control speed and air flow of its spool. A controller is connected to the main generator and auxiliary generator/motor, or to a power electronics unit associated therewith, for controlling their operation.

The turbine engine can have various configurations. In one embodiment, the first spool comprising the first compressor and turbine is a high-pressure spool. The second spool having the second turbine also includes a second compressor and forms a low-pressure spool. Air pressurized by the low-pressure compressor is fed into the high-pressure compressor where it is further pressurized before being fed into the combustor. Combustion gases are fed into the high-pressure turbine, which exhausts into the low-pressure turbine. Thus, in this embodiment the engine essentially comprises a turbocharged engine. The main generator is mounted on the high-pressure shaft and the auxiliary generator/motor is mounted on the low-pressure shaft. Speed control of the main generator can be used to control speed of, and hence air flow rate through, and pressure ratio of, the high-pressure spool. Speed control of the auxiliary generator/motor can be used to control speed of, and hence air flow rate through, and pressure ratio of, the low-pressure spool. Preferably, the main generator and auxiliary generator/motor are used together in a coordinated manner to achieve simultaneous control over the speed, and hence the air flow and pressure ratio, for both spools.

In an alternative embodiment of the invention, the engine is configured with low- and high-pressure spools as above, but the main generator is coupled with the low-pressure spool and the auxiliary generator/motor is coupled with the high-pressure spool.

In still another embodiment of the invention, the second spool does not include a compressor, and the second turbine comprises a free power turbine. The first spool or gasifier feeds the power turbine. The main generator can be coupled with the gasifier shaft and the auxiliary generator/motor can be coupled with the power turbine shaft, or the main generator can be coupled with the power turbine shaft and the auxiliary generator/motor can be coupled with the gasifier shaft.

In the various embodiments of the invention, further features can be included. For example, a heat exchanger or recuperator can be used to pre-heat the air that is mixed with the fuel, or to pre-heat the air-fuel mixture; the recuperator causes heat exchange between the air or mixture and the exhaust gases discharged from the engine. At very low part-load conditions, if the peak cycle temperature were maintained at the same level as the 100 percent load point, the temperature of the exhaust gases entering the recuperator could exceed a maximum allowable value (dictated by material limits, for example). Accordingly, in accordance with the invention, at such conditions, the main and auxiliary generator speeds are controlled so as to control air flow rate through the engine and thereby control fuel/air ratio in such a manner that the temperature of the exhaust gases entering the recuperator does not exceed the predetermined maximum allowable value.

It is also possible to include an intercooler between low-pressure and high-pressure compressors of the engine to derive the benefits of intercooling, as well known in the art.

In another aspect of the invention, the fuel is combusted in a catalytic combustor having a predetermined minimum inlet temperature required for maintenance of a catalytic reaction in the combustor. In many conventional engine control schemes, the combustor inlet temperature tends to fall as engine load is reduced below the 100 percent load condition; accordingly, it is possible for the temperature to fall below the minimum temperature required for the catalytic reaction. In accordance with the invention, the fuel/air ratio is controlled in such a manner at part-load conditions that an inlet temperature to the combustor is at least as great as the predetermined minimum inlet temperature. The fuel/air ratio is controlled through control of the air flow rate, which is accomplished by controlling the speeds of the spools via the main generator and auxiliary generator/motor as previously described.

A system for generating electrical power for supply to a load, in accordance with one embodiment of the invention, includes a first spool comprising a first shaft on which a first compressor and a first turbine are mounted, and a second spool comprising a second shaft on which at least a second turbine is mounted. The second spool is rotatable independently of the first spool. The system includes a combustor for combusting or reacting an air-fuel mixture to produce hot gases that are fed into the first turbine, which drives the first compressor. Exhaust gases from the first turbine are fed into the second turbine. The system further comprises a main generator coupled with one of the shafts, and an auxiliary generator/motor coupled with the other of the shafts. A power electronics unit is coupled to the main generator and the auxiliary generator/motor for receiving the alternating electrical current from each and synthesizing an alternating output current at a predetermined frequency for supply to the load. The power electronics unit in one embodiment comprises an AC/DC module or rectifier structured and arranged to operate upon the alternating electrical currents from the main generator and auxiliary generator/motor so as to produce a non-alternating direct current at a non-alternating voltage, and a DC/AC module or inverter structured and arranged to operate upon the non-alternating direct current so as to synthesize an alternating output current and voltage at a predetermined frequency and relative phase for supply to the load. In one embodiment, the rectifier can be responsive to a current control signal to vary the level of the non-alternating direct current independently of the alternating electrical currents from the main generator and auxiliary generator/motor.

The system preferably also includes a generator power sensor operable to measure power output from the system, and a load power sensor operable to measure power demanded by the load. A controller is operable to control the fuel system so as to cause the power output from the system to substantially match the power demanded by the load, and simultaneously to control the speed of the main generator so as to control the speed of the spool to which the main generator is coupled (and hence air flow rate of the spool). The auxiliary generator/motor is operated to either extract power from or inject power into the spool to which it is coupled so as to achieve various effects as noted above.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
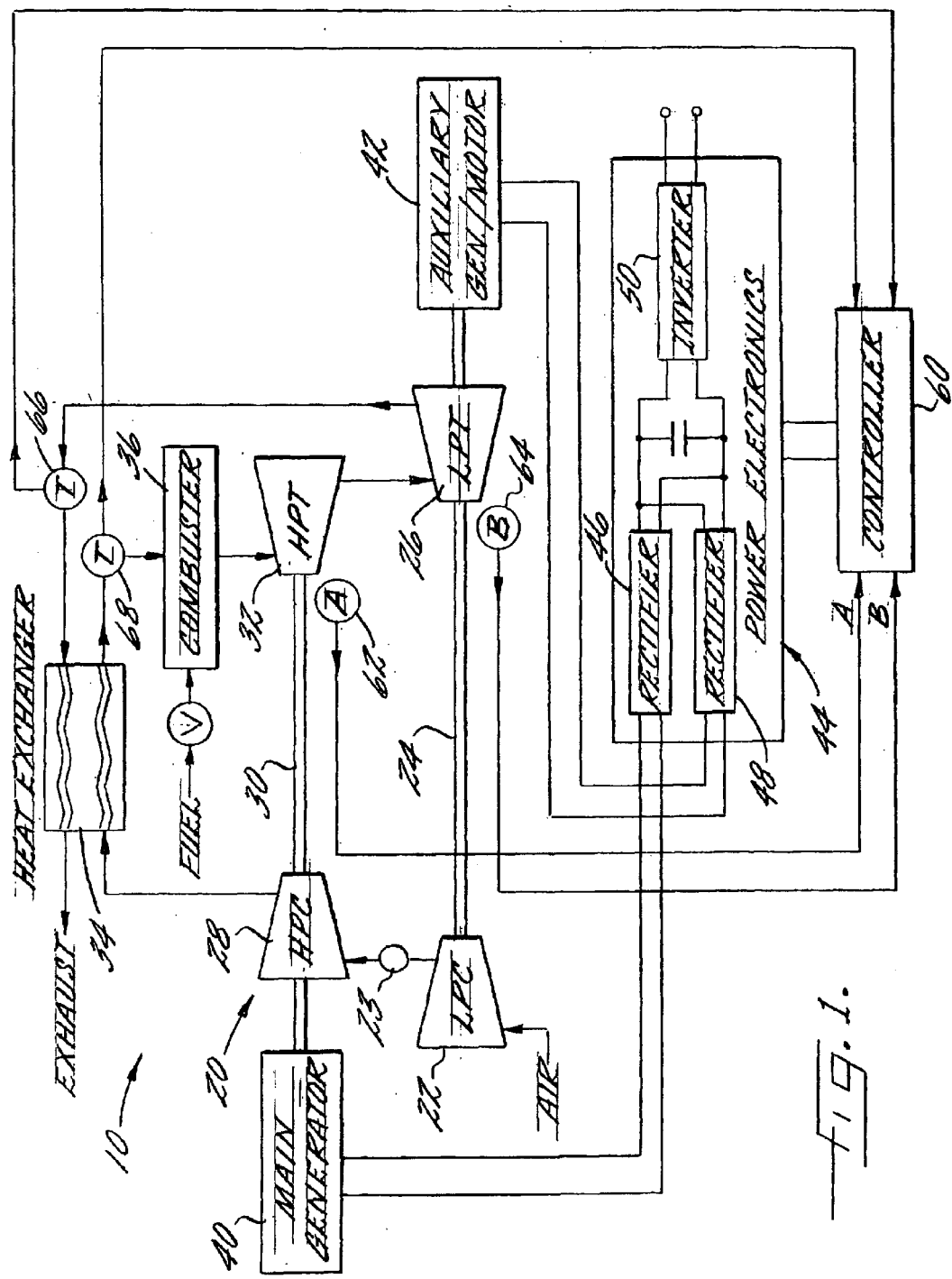
FIG. 1 is a diagrammatic view of an electrical generation system in accordance with one embodiment of the invention.

An electrical generator system 10 in accordance with one embodiment of the invention is schematically shown in FIG. 1. The system includes a gas turbine engine 20 that burns a mixture of fuel and air to produce hot combustion gases that are then expanded to create mechanical power. In the illustrated embodiment, the turbine engine includes a low-pressure spool and a high-pressure spool. The low-pressure spool comprises a low-pressure compressor 22 mounted on one end of a rotatable shaft 24 and a low-pressure turbine 26 mounted on the other end of the shaft. The high-pressure spool includes a high-pressure compressor 28 mounted on one end of a second shaft 30 and a high-pressure turbine 32 mounted on the other end of the shaft 30. The low-pressure compressor 22 is arranged to supply pressurized air from its discharge to the intake side of the high-pressure compressor 28, which further compresses the air. An optional intercooler 23 can be provided between the low-pressure and high-pressure compressors for cooling the pressurized air before it is fed into the high-pressure compressor. The compressed air is then fed through a recuperator or heat exchanger 34 where the air is pre-heated by heat exchange with the engine exhaust, as further described below. The air is then fed into a combustor 36 along with fuel supplied via a fuel control valve 38; alternatively, the air and fuel can be mixed at any of various points upstream of the combustor; for example, the fuel can be introduced into the low-pressure compressor along with the air and mixing can take place in the compression system of the engine, which is advantageous because a separate fuel compressor can be eliminated and the fuel can be pre-heated in the heat exchanger 34. The combustor can be of various types, including but not limited to diffusion flame, catalytic, lean pre-mixed, or others. The fuel/air mixture is burned in the combustor and the hot combustion gases are supplied to the high-pressure turbine 32, which expands the gases, causing the turbine to be rotatably driven. The high-pressure turbine in turn rotates the shaft 30, which drives the high-pressure compressor 28.

The exhaust gases from the high-pressure turbine 32 are fed into the low-pressure turbine 26, which expands the gases further, causing the turbine to be rotatably driven, thereby driving the low-pressure compressor 22. The exhaust gases from the low-pressure turbine 26 are passed through the heat exchanger 34 to pre-heat the air or air-fuel mixture to be introduced into the combustor.

Mounted on or coupled with the high-pressure shaft 30 is a main generator 40. The generator can be of various types, including permanent magnet generators or wound generators, or combinations thereof. The high-pressure shaft rotatably drives the main generator, which is operable to generate an alternating electrical current. The main generator can be directly mounted on or connected to the shaft such that a one-to-one speed relationship exists between the shaft and the generator, or alternatively the generator and shaft can be connected through a gear train or the like so that a different speed relationship exists. In any event, the speed at which the main generator 40 operates dictates the speed of the high-pressure shaft 30, and hence the speed at which the high-pressure spool of the engine operates.

The system 10 also includes a fuel system for supplying fuel to the combustor 36. The fuel system generally includes a fuel pump (not shown) and a fuel metering valve 38 that is controllable by a suitable control signal so as to control the fuel flow rate. As previously noted, the fuel can be introduced for mixing with air at any of various points in the engine.

The system 10 further includes an auxiliary generator/motor 42 mounted on or coupled with the low-pressure shaft 24. The auxiliary generator/motor 42 is selectively operable in either a generation mode or a motor mode. In the generation mode, the auxiliary generator/motor is rotatably driven by the low-pressure turbine 26 and generates an alternating electrical current. In the motor mode, electrical power is supplied to the auxiliary generator/motor and it operates as a motor to rotatably drive the shaft 24. The auxiliary generator/motor is controlled, along with the main generator 40, as further described below, to achieve various desirable effects on the operation of the engine 20.

The system 10 also includes a power electronics unit 44. In the illustrated embodiment, the power electronics unit includes a main rectifier 46 operable to convert the alternating electrical current produced by the main generator 40, which can vary in frequency as the speed of the generator varies, into a non-alternating direct current, and further operable in a current-control mode to control the level of the direct current independently of the characteristics of the alternating input current (within certain limits). Such active current control is generally based on pulse-width modulation (PWM) schemes utilizing semiconductor switching devices that perform switching operations at a high frequency and effectively allow current to pass only during a portion of each period of the input current waveform. This "time window" during which current is allowed to pass can be varied in duration so as to vary the "average" current output from the main rectifier. The power electronics unit also includes an auxiliary rectifier 48 operable to convert the alternating electrical current produced by the auxiliary generator/motor 42 in the generation mode into a non-alternating direct current, and further operable in a current-control mode to control the level of the direct current independently of the characteristics of the alternating input current (within certain limits), in similar fashion to the main rectifier.

The power electronics unit further includes an inverter 50 that processes the outputs from the rectifiers 46, 48 so as to synthesize an alternating output current at a fixed frequency. In many countries, the standard mains frequency is 60 cycles per second, while in other countries it is 50 cycles per second. The output frequency from the inverter is selected to match the standard mains frequency used in the particular location at which the system 10 is to be operated.

The system 10 includes a controller 60 that is connected with the power electronics unit 44. The controller is operable to control the operation of the active current-controlled rectifiers 46, 48 by controlling operation of the semiconductor switching devices (not shown) that perform the switching operations to allow current to pass only during a portion of each period of the input current waveform to each rectifier. By controlling the time window during which current is allowed to pass, the controller controls the average level of the non-alternating direct current output from each rectifier. This current control is employed to regulate the speed at which the main generator 40 rotates; furthermore, when the auxiliary generator/motor 42 is operating in the generation mode, the current control is employed to regulate the speed of the auxiliary generator/motor. Through control of the main and auxiliary generator speeds, the operating points of the gas turbine engine components on their respective maps can be influenced in beneficial ways to achieve certain desirable effects, as further described below.

The system 10 also includes a number of sensors connected to the controller 60 for measuring various parameters. For instance, an output power meter (not shown) is arranged for measuring how much electrical power is being generated by the system. One or more engine sensors 62, 64 monitor one or more thermodynamic or performance variables (e.g., air flow, power, fuel flow rate, compressor inlet pressures, compressor discharge pressures, etc.) associated with the engine cycle. These variables can be used for determining where the engine components are operating on their maps, i.e., whether the engine is running at or near its design point or is running significantly off-design. In the illustrated embodiment, the sensor 62 is associated with the high-pressure spool, and the sensor 64 is associated with the low-pressure spool. The sensor 62 can measure a turbine inlet temperature at the inlet to the high-pressure turbine 32, or another parameter from which the turbine inlet temperature can be deduced or estimated. The turbine inlet temperature of the high-pressure turbine represents the peak temperature of the working fluid in the engine and has a significant bearing on the overall efficiency of the engine. Hence, by measuring HPT inlet temperature along with other parameters, it is possible to deduce a relative thermodynamic efficiency of the engine. The sensor 64 similarly can measure the inlet temperature of the low-pressure turbine 26 or another parameter from which this temperature can be deduced or estimated. The system preferably also includes sensors (not shown) for measuring at least two of the flow rate, speed, and pressure ratio (or equivalent parameters) of each of the compressors so that the operating points of the compressors can be deduced.

The controller 60 is connected to each of the above-noted sensors. The controller can regulate the operation of the engine, via regulation of the main and auxiliary generators, in such a manner that at any operating condition for the engine, the overall efficiency of the engine is substantially maximized. Generally this entails maximizing the turbine inlet temperature to each of the turbines. Control over the turbine inlet temperature is accomplished primarily by controlling the fuel/air ratio of the mixture burned in the combustor via control of the air flow rate, which is a function of the speed of the rotating components of the engine. In some cases, however, the turbine inlet temperature cannot be regulated without regard to other constraints that must be taken into account.

For example, at part-load conditions, if the engine is not properly controlled, the inlet temperature to the recuperator 34 could exceed the maximum allowable level dictated by material limits. Accordingly, a sensor 66 measures an inlet temperature to the recuperator 34 in the exhaust-gas stream. The controller 60 advantageously is connected to the sensor 66 for monitoring the recuperator inlet temperature, and the controller regulates the operation of the engine via regulation of the main and auxiliary generators to prevent the temperature from exceeding the material limit, while maintaining the turbine inlet temperature as high as possible within this additional constraint.

The particular control scheme by which the controller accomplishes the control of the engine operation is not critical to the invention. For example, for each of the spools of the engine, the controller may have stored in memory a predetermined schedule of turbine inlet temperature versus a suitable parameter that is monitored by the controller. The parameters that are monitored should give an indication of where the engine components are operating on their maps. A suitable control algorithm can be used by the controller to control air flow (via control of generator speeds in some suitable manner, such as by controlling the DC currents from the rectifiers) in such a manner that the turbine inlet temperatures are caused to substantially match the values dictated by the predetermined schedules. This is merely a simplified example of one possible control scheme, and other schemes may be used in accordance with the invention.

As noted, the auxiliary generator/motor is operable in either the generation mode or in a motor mode. Thus far in the present description, speed control in the generation mode has been described. However, the motor mode can also be used for speed control. In the motor mode, the auxiliary generator/motor injects power into the low-pressure spool and thereby speeds up the low-pressure spool; the amount of power injected determines the extent to which the spool speed is increased. Conversely, in the generation mode, the auxiliary generator/motor extracts power from the spool, and the amount of power extracted determines the extent to which the spool speed is reduced. By selecting the appropriate mode and suitably controlling the auxiliary generator/motor, the speed of the spool can be regulated over a substantial speed range. The controller 60 performs the mode selection and the regulation of the auxiliary generator/motor. In the motor mode, electrical power is supplied to the auxiliary generator/motor to drive it. The power can be taken from the main generator via suitable circuitry (not shown) in the power electronics unit 44. The high-frequency, high-voltage (e.g., about 400 to 900 volts) current from the main generator can be used to drive the auxiliary generator/motor without any necessity of first converting the current to a low frequency and low voltage. Various control schemes can be used for controlling the auxiliary generator/motor in the motor mode, including but not limited to volts/hertz control, sensorless vector control, flux vector control, or field-oriented control, as known in the field of AC motor control.

Another feature of the invention is the use of the auxiliary generator/motor in the motor mode to drive the associated spool during start-up of the engine. Accordingly, a separate starter can be omitted. During start-up, electrical power can be supplied to the auxiliary generator/motor from a suitable source, such as a battery and inverter or other supply.

Figure 2:
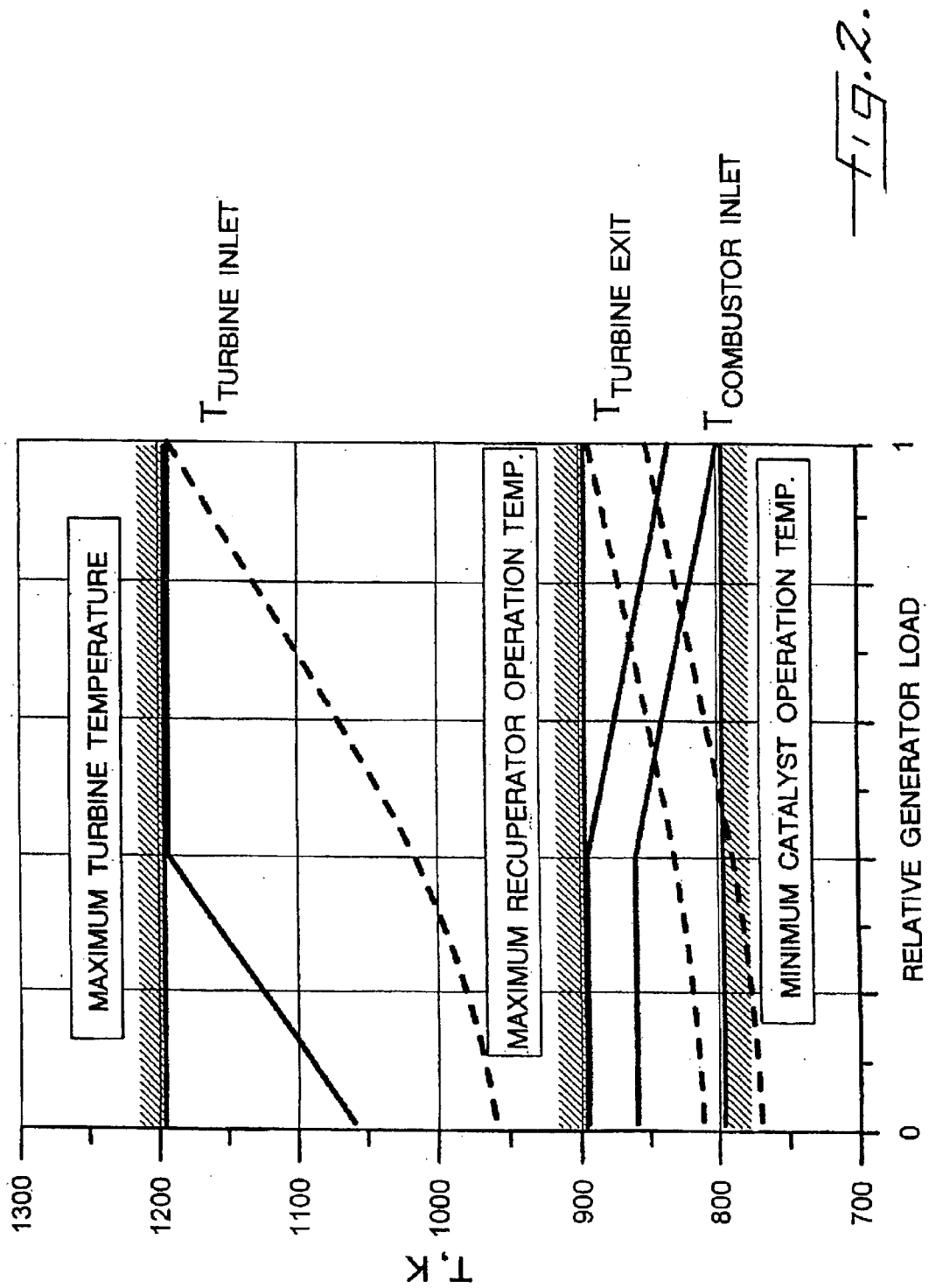
FIG. 2 is a plot of temperatures at various points in the engine as functions of the relative generator load, comparing a prior-art control method (dashed lines) with a control method in accordance with one embodiment of the invention (solid lines)

FIG. 2 depicts an exemplary turbine inlet temperature versus relative generator load characteristic, and compares various temperatures at different points in the engine of the system 10 (solid lines) with corresponding temperatures that would exist if a prior-art type of control approach were taken (dashed lines). In accordance with the invention, at a relative generator load value of 100 percent (i.e., the design point for the engine), the high-pressure turbine inlet temperature is substantially equal to a maximum allowable turbine inlet temperature of about 1200 K. The HPT inlet temperature is maintained at this value down to a relative generator load of about 40 percent. In contrast, in the prior-art control approach, the turbine inlet temperature steadily drops as the load drops below 100 percent. Consequently, at the same relative load, the overall engine efficiency is higher for the control scheme in accordance with the invention than for the prior-art control scheme.

At a relative load of 40 percent, it can be seen that the low-pressure turbine exit temperature (which is essentially equal to the recuperator inlet temperature) has increased up to the maximum allowable recuperator temperature of about 900 K. At still lower loads, if the HPT inlet temperature were maintained at about 1200 K, the LPT exit temperature would exceed the maximum allowable recuperator temperature. Accordingly, in accordance with the invention, the HPT inlet temperature is allowed to drop below 1200 K by an amount sufficient to prevent the recuperator inlet temperature from exceeding the maximum allowable level.

Another factor that can influence the control of the system arises when the combustor 36 is a catalytic combustor. As noted, catalytic combustors have a minimum inlet temperature that must be maintained in order to sustain the catalytic reaction. In the prior-art control approach, it can be seen in FIG. 2 that below a relative load of about 50 percent the combustor inlet temperature falls below this minimum temperature of about 800 K. In accordance with the invention, however, the combustor inlet temperature can be controlled via regulation of the main generator and auxiliary generator/motor so that it does not fall below the catalyst minimum temperature at any operating point of the engine. To this end, the system preferably includes a combustor inlet temperature sensor 68 connected to the controller 60. The controller monitors the combustor inlet temperature and controls the generators in appropriate fashion to always maintain the temperature at or above the catalyst minimum. In FIG. 2, for instance, it can be seen that the combustor inlet temperature using the inventive control approach rises from about 800 K at the 100 percent load point to about 860 K at the 40 percent load point. Below 40 percent load, the combustor inlet temperature remains about constant at approximately 860 K. The invention thus enables efficiency improvements to be realized at part-load conditions while also allowing proper operation of the catalytic combustor at all operating points and at all times.

It will also be noted from FIG. 2 that the combustor inlet temperature is generally higher in the inventive control approach than in the prior-art approach. Advantageously, a higher fuel/air ratio and higher combustor inlet temperature generally favor lower emissions for pre-mixed low-emissions combustors.

The control scheme described thus far has assumed that turbine inlet temperature is measured directly and used as a control parameter. In some cases, however, it may not be practical to measure turbine inlet temperature because of the extreme usage environment in which a turbine inlet temperature sensor would have to operate. Alternatively, therefore, it is possible to measure other thermodynamic variables in the engine cycle and deduce the turbine inlet temperature based on cycle calculations. As still another alternative, the controller could store a schedule of a suitable control parameter (e.g., engine air flow rate) versus relative generator load, and thermodynamic variables could be measured enabling the control parameter to be deduced; the controller would then drive the actual (i.e., deduced) control parameter to substantially equal the scheduled value.

The particular control method that is used, and the parameters measured for practicing the method, are not critical. The basic concept of the invention entails controlling operation of the engine via regulation of the main generator and auxiliary generator/motor.

At the same time, in a load-following operational mode, the power output from the generator system 10 must be controlled to match the power demanded by the load. The power output is primarily a function of the fuel flow rate. Accordingly, in a load-following mode, the controller simultaneously controls air flow as described above while also controlling the power output (as measured by a suitable power meter, not shown) to match the demand. Load-following control schemes are well known and hence are not further described herein.

Depending on the particular application, the system 10 may also be operated in modes other than load-following. In such cases, the same type of speed and air flow control already described would still be employed.

The invention entails electrically controlling the main and auxiliary generator speeds so as to control the air flow rate through the engine and thereby optimize engine efficiency and possibly achieve other effects as previously noted. In the case of a permanent magnet generator, the control of the generator is accomplished by controlling the rectifier as already described. In the case of a wound generator, a number of control schemes are possible. In one scheme, the controller controls an excitation system (not shown) to regulate the generator speed. The AC/DC and DC/AC conversion may not be necessary, and instead an AC/AC converter may be used to synthesize the AC output current at the desired frequency for supply to the load. Alternatively, the rectifier and inverter may be used as previously described, in which case the rectifier does not have to be current-controlled since the regulation of generator speed can be performed by controlling the excitation system.

In another scheme, generator speed control may be accomplished through a combination of controlling the excitation system and controlling the rectifier.

The particulars of how the generator speed is controlled are not critical to the invention, and various schemes for accomplishing this can be used in accordance with the invention.

Advantageously, the invention allows control over the thermodynamic cycle of an engine having fixed-geometry compressor, turbine, and combustor components.

Figure 3:
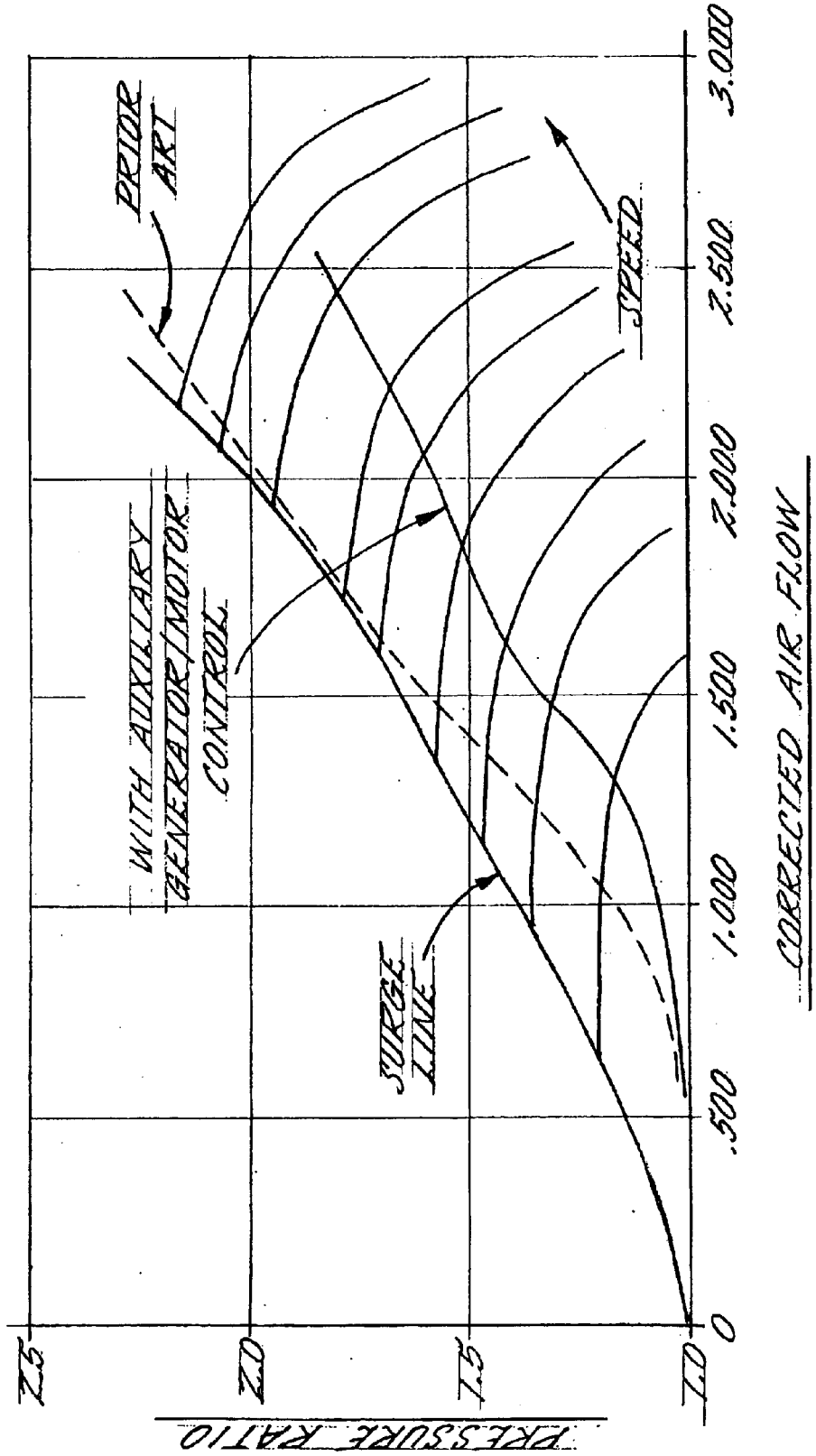
FIG. 3 is a plot of a map for the low-pressure compressor of the engine of FIG. 1, showing operating lines both with and without auxiliary generator/motor control at an ambient temperature of −30° C.

Another beneficial result that can be achieved via regulation of the main and auxiliary generators is avoidance of the surge region of operation for the compressors, and particularly for the low-pressure compressor, which is more-prone to surge problems than is the high-pressure compressor. Surge is especially troublesome at certain operating conditions such as when the ambient temperature is low. As the ambient temperature drops, the operating line for the low-pressure compressor rises on the pressure-ratio versus flow map for the compressor, and thus moves toward the surge line. Regulation of engine operation with the aid of the auxiliary generator/motor allows the compressor to operate at a lower operating line than would otherwise be the case, thereby reducing the likelihood that surge will be encountered. FIG. 3 shows a representative map for the low-pressure compressor. An operating line for an ambient temperature of minus 30° C. is shown for a prior-art engine with no auxiliary generator/motor, and for an engine in accordance with the invention having an auxiliary generator/motor that is regulated to control the behavior of the low-pressure compressor. It can be seen that at higher-flow conditions, the operating line for the prior-art engine has little if any surge margin. However, utilization of the auxiliary generator/motor control drops the operating line substantially so that there is a much greater surge margin.

Figure 4:
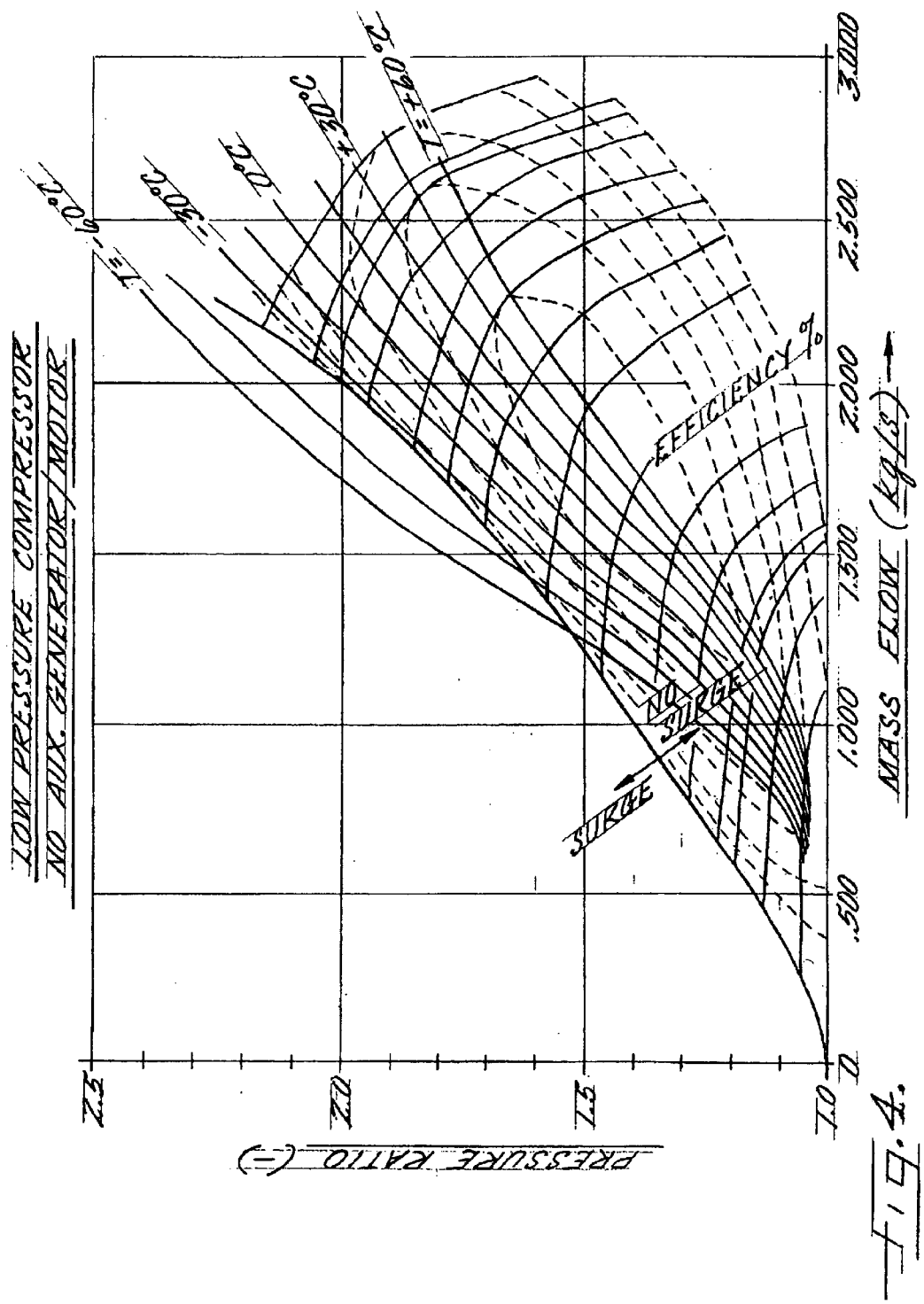
FIG. 4 shows a low-compressor map for a prior-art engine without auxiliary generator/motor control.

The control over the location of the operating line for the compressor can also allow the compressor to operate at or near the peak-efficiency region of its map over a wide range of conditions. In a conventional engine system without auxiliary generator/motor control, large variations in ambient temperature, for example, tend to result in large movements of the operating line on the map. In particular, as ambient temperature drops, the operating line moves up to higher pressure ratios at a given flow, and thus can move away from the peak-efficiency region of the map. As an example, FIG. 4 shows a low-compressor map for a prior-art engine without auxiliary generator/motor control. It can be seen that the operating line for +30° C. is near the peak-efficiency region of the map, but at −30° C. the line has climbed up significantly and thus is no longer near the peak-efficiency region. It would be desirable to control the operating line so that over a wide range of temperatures the compressor operates near the peak-efficiency region. The auxiliary generator/motor control of the present invention accomplishes this objective.

Figure 5:
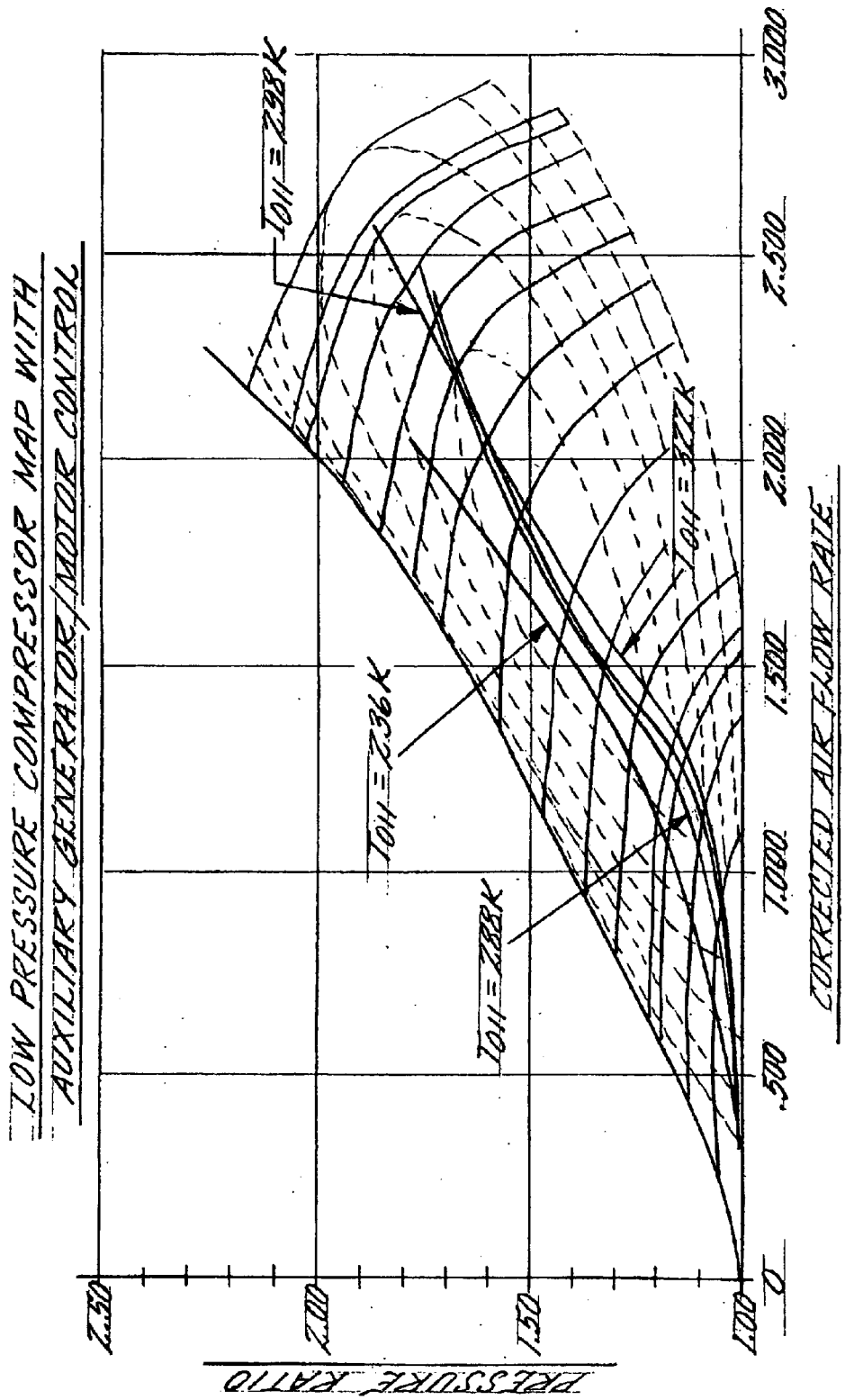
FIG. 5 shows a low-pressure compressor map when auxiliary generator/motor control is used on the low-pressure spool, also depicting operating lines for several different ambient temperatures.
Figure 6:
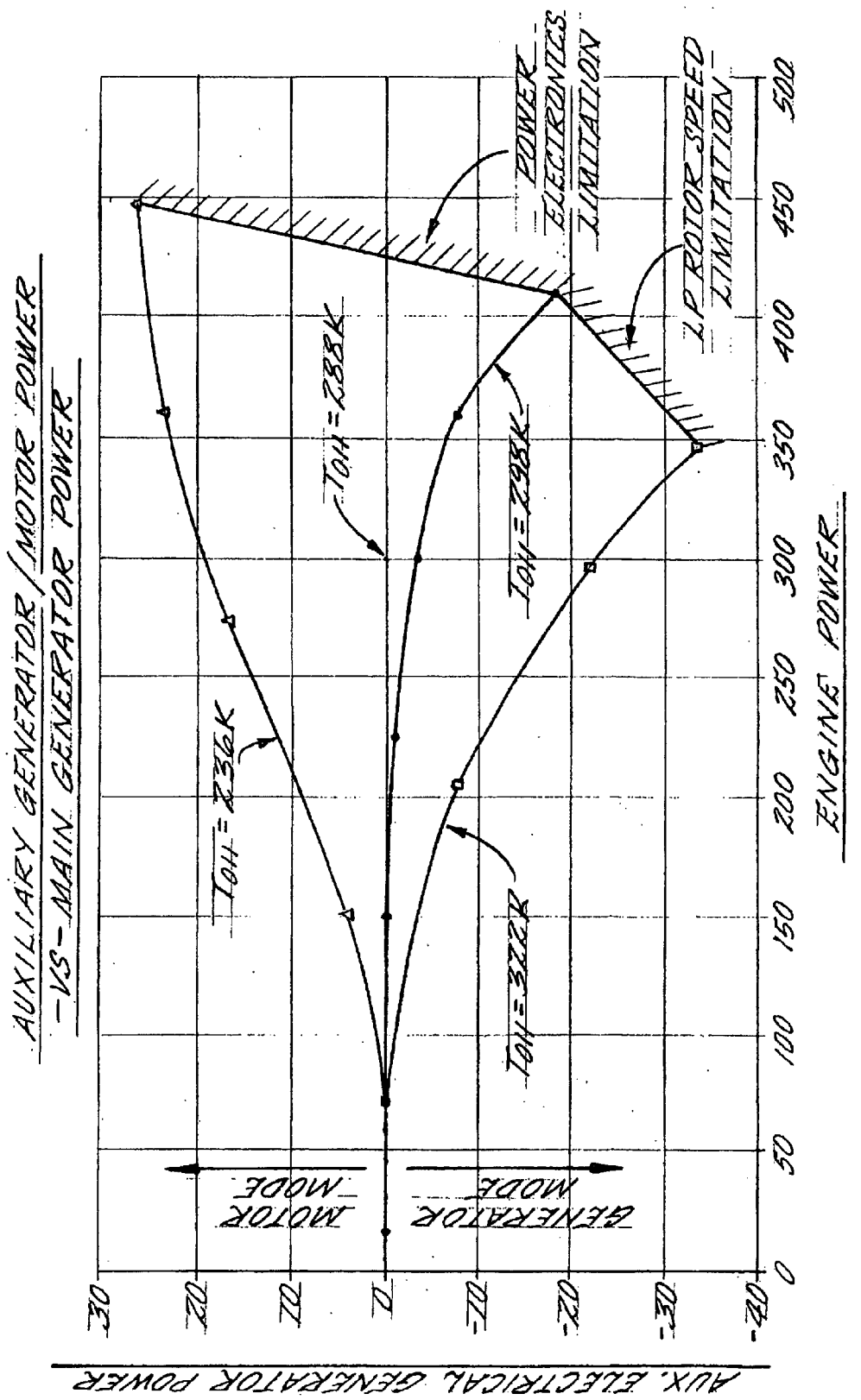
FIG. 6 shows auxiliary generator/motor power versus main generator power for several different ambient temperatures.

FIG. 5 shows a low-pressure compressor map when auxiliary generator/motor control is used on the low-pressure spool. Operating lines are shown for ambient temperatures of 322 K (approximately +50° C.), 298 K (+25° C.), 288 K (+15° C.), and 236 K (−37° C.). Over that range of 86 degrees, the operating line undergoes relatively little movement by virtue of the auxiliary generator/motor control. To achieve this result, the auxiliary generator/motor either injects power into or extracts power from the low-pressure spool, as needed. This is illustrated in FIG. 6, which depicts the auxiliary generator/motor power versus main generator power for the four different ambient temperatures represented on the map of FIG. 5. It can be seen that at a low ambient temperature of 236 K (−37° C.), the auxiliary generator/motor is injecting power into the low-pressure spool to speed it up (i.e., the motor mode), thereby dropping the operating line on the map. At a high ambient temperature of 322 K (approximately +50° C.), the auxiliary generator/motor is extracting power from the spool to slow it down (i.e., the generator mode), thereby raising the operating line.

Figure 7:
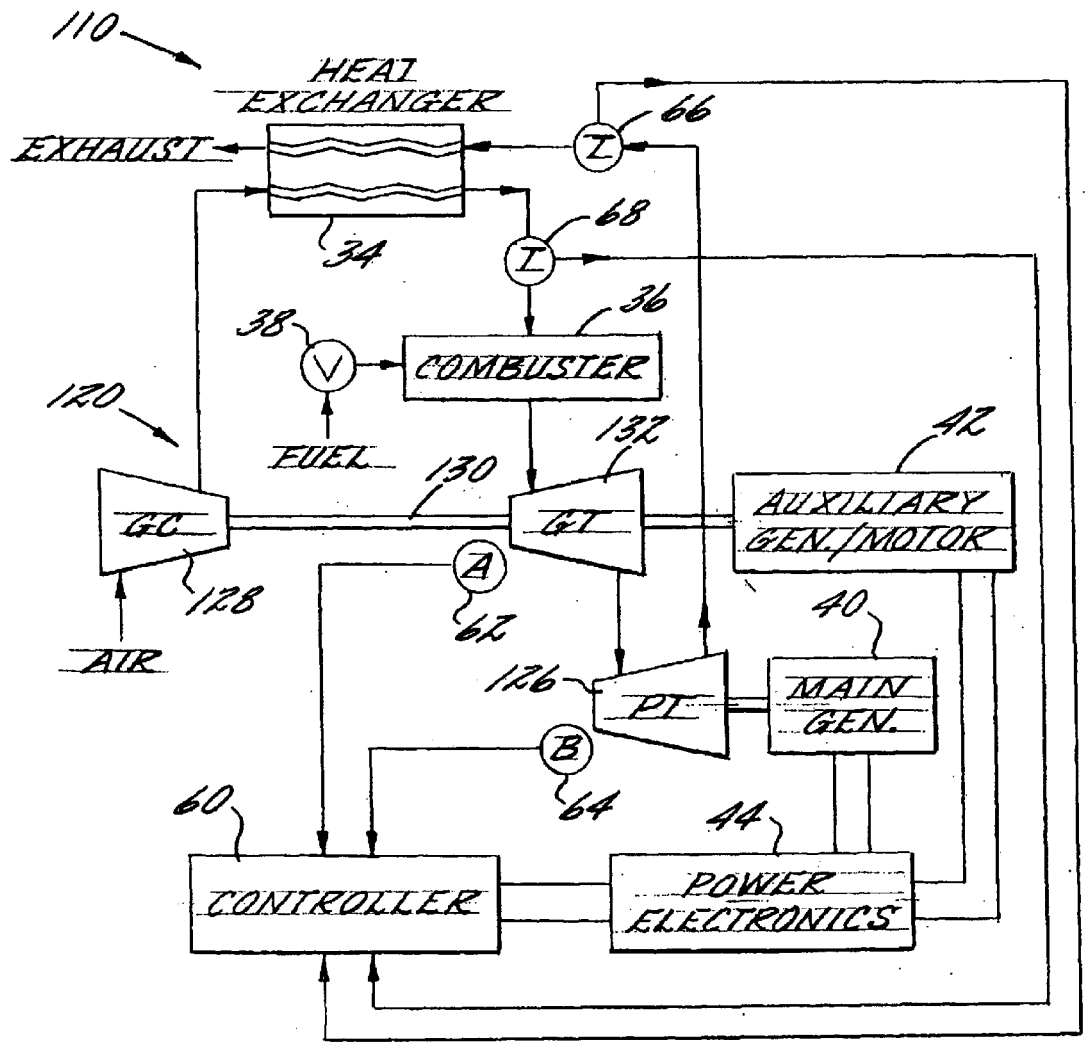
FIG. 7 is a diagrammatic view of an electrical generation system in accordance with a second embodiment of the invention.

The invention is not limited to the type of dual-spool engine shown in FIG. 1. FIGS. 7–10 show four other alternative embodiments of the invention. In FIG. 7, a generation system 110 is depicted that includes an engine 120 having a free power turbine fed by a gasifier. The gasifier includes a compressor 128 mounted on a shaft 130 and a turbine 132 also mounted on the shaft 130. The gasifier includes a recuperator 34, a combustor 36, and fuel metering valve 38 as in the previously described embodiment. A free power turbine 126 is arranged to receive the exhaust gases from the gasifier and expand them to rotatably drive the power turbine. A main generator 40 is mounted on or coupled with the shaft on which the power turbine 126 is mounted such that it is driven by the power turbine. An auxiliary generator/motor 42 is mounted on or coupled with the gasifier shaft 130 and is driven by the turbine 132. A power electronics unit 44 is connected with the generators as in the previous embodiment. A recuperator inlet temperature sensor 66 and a combustor inlet temperature sensor 68 are included, as are engine sensors 62, 64, as in the previous embodiment. A controller 60 is connected with the power electronics unit and the various sensors, and is operable to regulate the speed of the gasifier via regulation of the auxiliary generator/motor, and to regulate the speed of the free power turbine 126 via regulation of the main generator. Such speed control can be employed to accomplish any of the objectives previously described.

Figure 8:
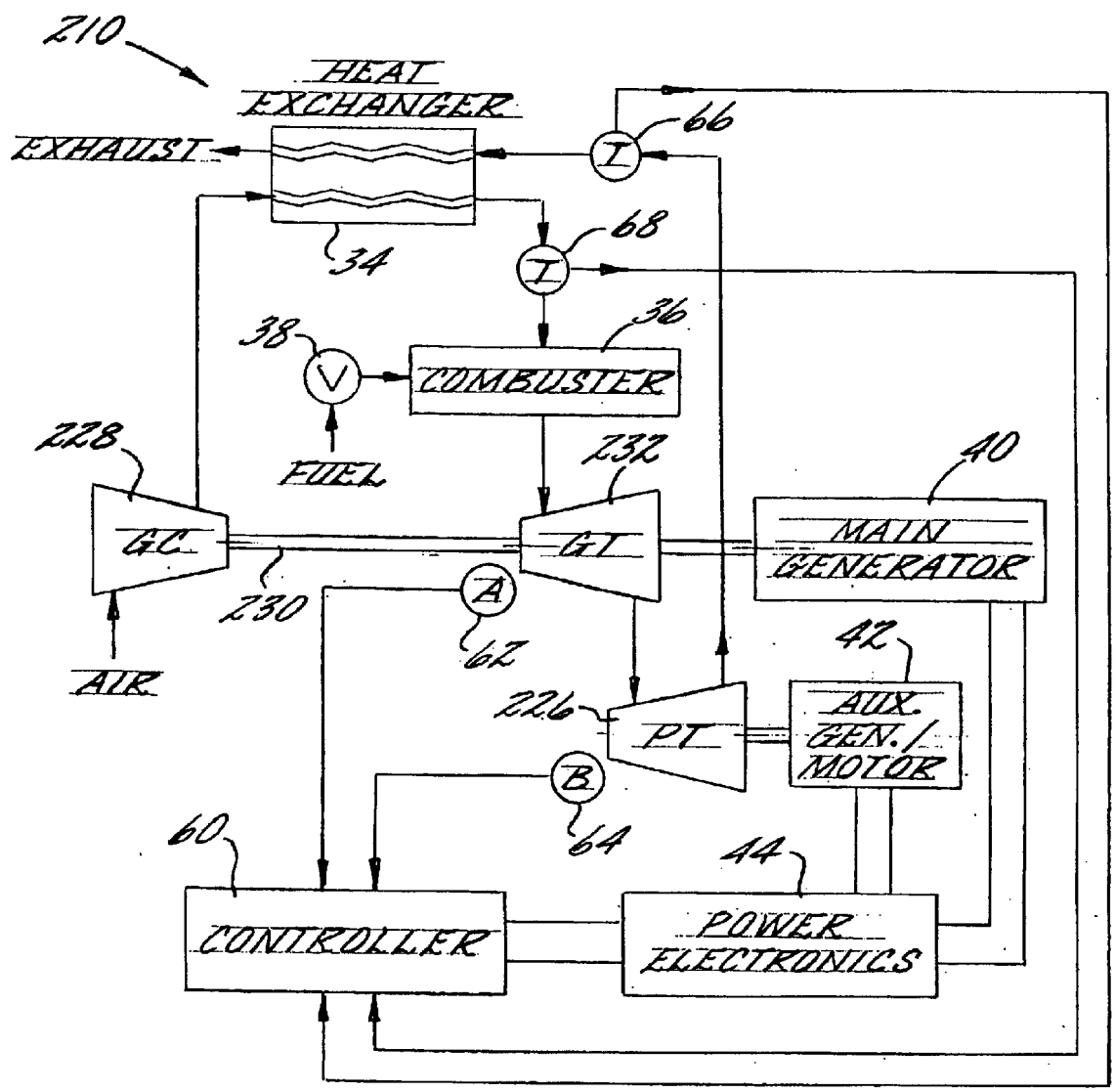
FIG. 8 is a diagrammatic view of an electrical generation system in accordance with a third embodiment of the invention.

In FIG. 8, a generation system 210 is depicted that includes an engine 220 having a free power turbine fed by a gasifier. The gasifier includes a compressor 228 mounted on a shaft 230 and a turbine 232 also mounted on the shaft 230. The gasifier includes a recuperator 34, a combustor 36, and fuel metering valve 38 as in the previously described embodiments. A free power turbine 226 is arranged to receive the exhaust gases from the gasifier and expand them to rotatably drive the power turbine. A main generator 40 is mounted on or coupled with the gasifier shaft 230 and is driven by the turbine 232. An auxiliary generator/motor 42 is mounted on or coupled with the shaft on which the power turbine is mounted such that it is driven by the power turbine. A power electronics unit 44 is connected with the generators as in the previous embodiments. A recuperator inlet temperature sensor 66 and a combustor inlet temperature sensor 68 are included, as are engine sensors 62, 64, as in the previous embodiments. A controller 60 is connected with the power electronics unit and the various sensors, and is operable to regulate the speed of the gasifier via regulation of the main generator, and to regulate the speed of the free power turbine 226 via regulation of the auxiliary generator/motor. Such speed control can be employed to accomplish any of the objectives previously described.

Figure 9:
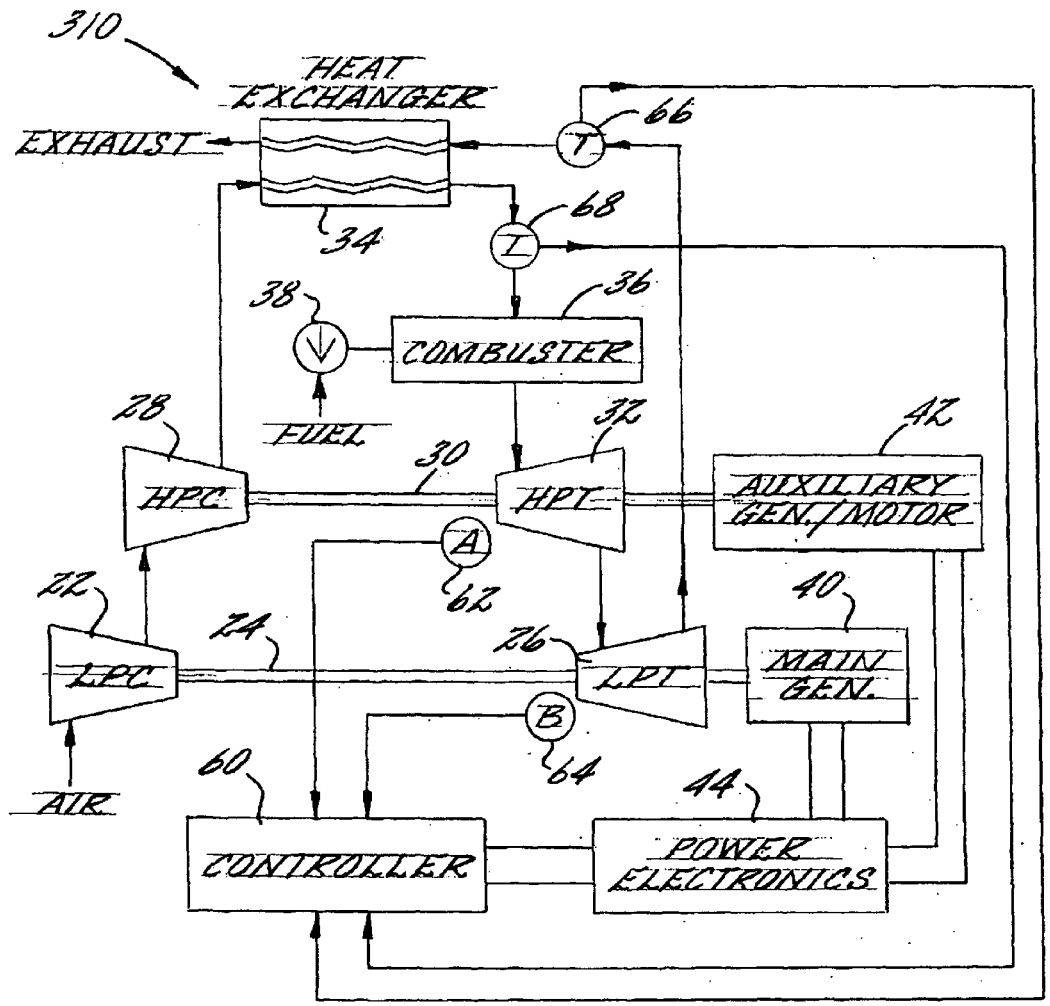
FIG. 9 is a diagrammatic view of an electrical generation system in accordance with a fourth embodiment of the invention.

A further embodiment of the invention is shown in FIG. 9. A generation system 310 includes a dual-spool engine 20 substantially as described in the FIG. 1 embodiment. A main generator 40 is mounted on or coupled with the low-pressure shaft 24 such that it is driven by the low-pressure turbine 26. An auxiliary generator/motor is mounted on or coupled with the high-pressure shaft 30 such that the high-pressure turbine drives, or is driven by, the auxiliary generator/motor. A power electronics unit 44 is connected with the generators as in the previous embodiments. A recuperator inlet temperature sensor 66 and a combustor inlet temperature sensor 68 are included, as are engine sensors 62, 64 as in the previous embodiments. A controller 60 is connected with the power electronics unit and the various sensors, and is operable to regulate the speed of the low-pressure spool via regulation of the main generator, and to regulate the speed of the high-pressure spool via regulation of the auxiliary generator. Such speed control can be employed to accomplish any of the objectives previously described.

Figure 10:
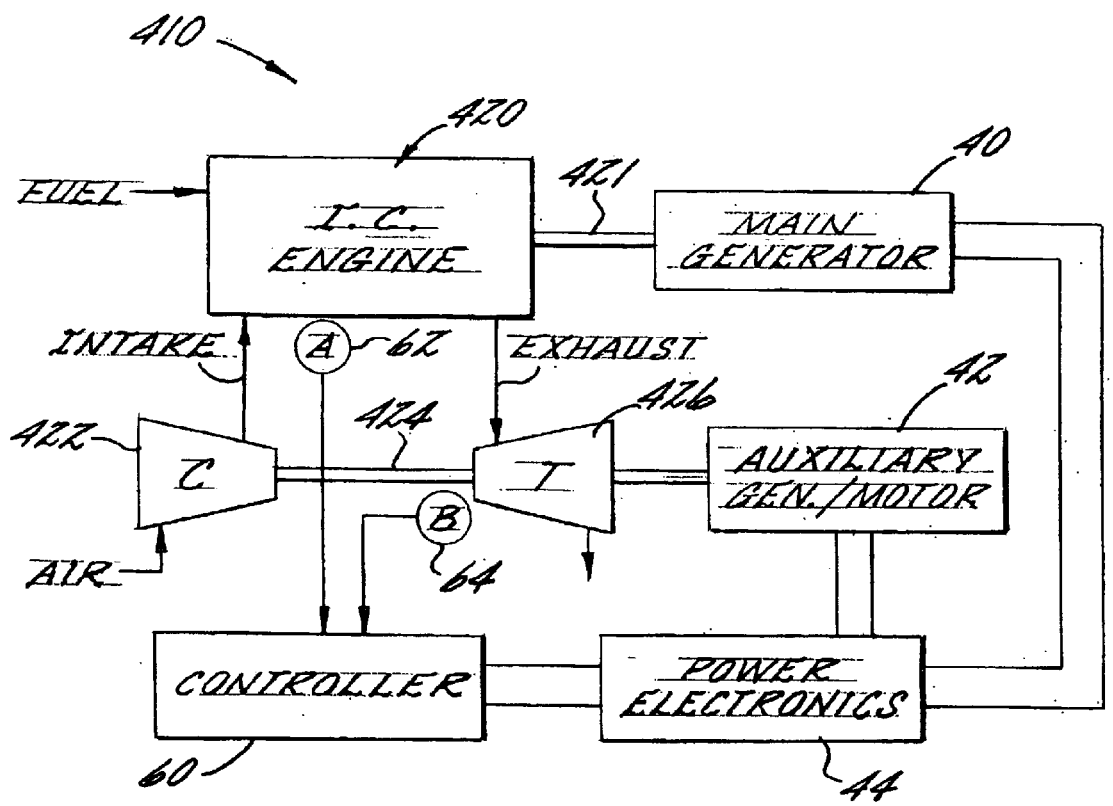
FIG. 10 is a diagrammatic view of an electrical generation system in accordance with a fifth embodiment of the invention.

Finally, the invention is not limited to turbocharged engine cycles wherein the engine is a gas turbine, but can be applied to turbocharged reciprocating engine cycles. FIG. 10 shows one possible example of the invention as applied to a turbocharged reciprocating engine. The electrical generation system 410 includes a reciprocating or internal combustion engine 420 that may be configured to burn any of various types of fuel and may operate with various types of thermodynamic cycles. An exhaust gas-driven turbocharger is coupled with the engine, and comprises a compressor 422 mounted on a shaft 424 and a turbine 426 mounted on the shaft for driving the compressor. Air compressed in the compressor 422 is supplied to the engine intake (optionally having first been cooled in an intercooler, not shown) and is mixed with fuel and supplied to the cylinders of the engine where it is combusted and the combustion gases are exhausted through an exhaust system and supplied to the turbine 426. The turbine expands the exhaust gases to produce mechanical power for driving the compressor. Mounted on or coupled with an output shaft 421 of the engine 420 is a main generator 40 for generating electricity. An auxiliary generator/motor 42 is mounted on or coupled with the shaft 424 of the turbocharger. A power electronics unit 44 is connected with the generators as in the previous embodiments. Sensors 62, 64 can be included as in the previous embodiments. A controller 60 is connected with the power electronics unit and the various sensors, and is operable to regulate the speed of the turbocharger via regulation of the auxiliary generator/motor. The controller may also, if desired, regulate the speed of the reciprocating engine via regulation of the main generator as previously described. Such speed control can be employed to accomplish any of the objectives previously described. These objectives apply particularly to a Homogeneous Charge Compression Ignition (HCCI) engine, which is essentially a reciprocating engine in which the fuel and air are pre-mixed prior to being introduced into the cylinders and then ignited via the heat of compression—i.e., a reciprocating engine employing lean pre-mixed combustion. Those skilled in the art of combustion will readily appreciate that the requirements and constraints of lean-premixed combustion are the same for reciprocating engines and turbines, and as such the advantages of the present invention apply to HCCI engines.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for operating an electrical generation system having a multi-spool gas turbine engine comprising at least first and second spools, the first spool including a first shaft, a first compressor mounted on the first shaft, a first turbine mounted on the first shaft, and a combustor operable to combust or react a mixture of fuel and compressed air from the first compressor to produce hot gases that are expanded in the first turbine to produce mechanical power to drive the first compressor, the second spool including a second shaft and at least a second turbine mounted on the second shaft, the second turbine arranged to receive gases exhausted from the first turbine and expand the gases to produce mechanical power, the second spool being rotatable independently of the first spool, the method comprising the steps of:

providing a main generator coupled with one of the first and second spools so as to be driven thereby, the main generator operable to generate an alternating current;

providing an auxiliary generator/motor coupled with the other of the first and second spools, the auxiliary generator/motor selectively operable in either a generation mode or a motor mode, the auxiliary generator/motor in the generation mode being operable to extract mechanical power from the spool to which the auxiliary generator/motor is coupled and generate an alternating electrical current for supply to the load, the auxiliary generator/motor in the motor mode being operable to receive electrical power from a source and convert the electrical power into mechanical power that is injected into the spool to which the auxiliary generator/motor is coupled;

causing the auxiliary generator/motor to operate in a selected one of the generation and motor modes; and controlling operation of the auxiliary generator/motor in the selected mode so as to affect an operating condition of the gas turbine engine.

2. The method of claim 1, wherein the causing step comprises causing the auxiliary generator/motor to operate in the generation mode so as to extract power from and slow down the spool to which the auxiliary generator/motor is coupled.

3. The method of claim 2, wherein the controlling step comprises regulating the rotational speed of the auxiliary generator/motor so as to regulate the rotational speed of the spool to which the auxiliary generator/motor is coupled.

4. The method of claim 1, wherein the causing step comprises causing the auxiliary generator/motor to operate in the motor mode so as to inject power into and speed up the spool to which the auxiliary generator/motor is coupled.

5. The method of claim 4, wherein the causing step is performed during a start-up turbine engine, the auxiliary generator/motor serving as a starter.

6. The method of claim 1, further comprising the step of regulating the rotational speed of the main generator so as to regulate the rotational speed of the spool to which the main generator is coupled.

7. The method of claim 6, wherein the regulating step comprises rectifying the alternating current from the main generator in an active current-controlled rectifier operable to convert the alternating current into a non-alternating direct current, and regulating the level of the direct current so as to regulate the rotational speed of the main generator.

8. The method of claim 7, wherein the main generator is coupled with the first spool and the auxiliary generator/motor is coupled with the second spool, the second spool including a second compressor mounted on the second shaft and arranged to compress air and supply the compressed air to the first compressor, and further comprising the steps of:

operating the auxiliary generator/motor in the generation mode so as to alter the mechanical power produced by the second spool; and regulating the operation of the auxiliary generator/motor so as to regulate the rotational speed of the first spool.

9. The method of claim 8, wherein the rotational speeds of the first and second spools are controlled, via regulation of the main generator and auxiliary generator/motor, such that an efficiency of the engine is substantially maximized.

10. The method of claim 8, comprising regulating the rotational speeds of the first and second spools, via regulation of the main generator and auxiliary generator/motor, so as to lower an operating line of at least one of the compressors on a compressor map thereof and thereby avoid a surge region of the map.

11. The method of claim 8, wherein the engine includes a heat exchanger arranged to receive the compressed air from the first compressor and exhaust gases from the second turbine, the heat exchanger causing heat transfer from the exhaust gases to the compressed air so as to pre-heat the compressed air prior to combustion in the combustor, the method further comprising the step of regulating the rotational speeds of the first and second spools, via regulation of the main generator and auxiliary generator/motor, so as to always maintain an inlet temperature to the heat exchanger below a predetermined maximum allowable temperature for the heat exchanger.

12. The method of claim 8, wherein the combustor comprises a catalytic combustor, the method further comprising the step of regulating the rotational speeds of the first and second spools, via regulation of the main generator and auxiliary generator/motor, so as to always maintain an inlet temperature to the combustor at or above a catalyst minimum temperature necessary for proper operation of the combustor.

13. The method of claim 1, further comprising the step of starting the engine, wherein during starting the auxiliary generator/motor is operated in the motor mode to rotatably drive the spool to which the auxiliary generator/motor is coupled.

14. A system for generating electrical power for supply to a load, comprising:
a gas turbine engine comprising:
a first spool including a first shaft, a first compressor mounted on the first shaft, a first turbine mounted on the first shaft, and a catalytic combustor operable to combust or react a mixture of fuel and compressed air from the first compressor to produce hot gases that are expanded in the first turbine to produce mechanical power to drive the first compressor; and
a second spool including a second shaft and at least a second turbine mounted on the second shaft, the second turbine arranged to receive gases exhausted from the first turbine and expand the gases to produce mechanical power, the second spool being rotatably independently of the first spool;
a main generator coupled to one of the first and second spools so as to be rotatably driven thereby, the main generator operable to generate an alternating electrical current for supply to the load;
an auxiliary generator/motor coupled to the other of the first and second spools, the auxiliary generator/motor selectively operable in either a generation mode or a motor mode, the auxiliary generator/motor in the generation mode being operable to extract mechanical power from the spool to which the auxiliary generator/motor is coupled and generate an alternating electrical current for supply to the load, the auxiliary generator/motor in the motor mode being operable to receive electrical power from a source and convert the electrical power into mechanical power that is injected into the spool to which the auxiliary generator/motor is coupled; and
a controller structured and arranged to control operation of the main generator and the auxiliary generator/motor, the controller being operable to select the mode in which the auxiliary generator/motor operates and to control the auxiliary generator/motor in the selected mode so as to affect an operating condition of the gas turbine engine.

15. A system for generating electrical power for supply to a load, comprising:
a gas turbine engine comprising:
a first spool including a first shaft, a first compressor mounted on the first shaft, a first turbine mounted on the first shaft, and a combustor operable to combust or react a mixture of fuel and compressed air from the first compressor to produce hot gases that are expanded in the first turbine to produce mechanical power to drive the first compressor; and
a second spool including a second shaft and at least a second turbine mounted on the second shaft, the second turbine arranged to receive gases exhausted from the first turbine and expand the gases to produce mechanical power;
a main generator coupled to one of the first and second spools so as to be rotatably driven thereby, the main generator operable to generate an alternating electrical current for supply to the load when the system is in load-serving operation; and
an auxiliary generator/motor coupled to the other of the first and second spools, the auxiliary generator/motor selectively operable in either a generation mode or a motor mode when the system is in load-serving operation, the auxiliary generator/motor in the generation mode being operable to extract mechanical power from the spool to which the auxiliary generator/motor is coupled and generate an alternating electrical current for supply to the load, the auxiliary generator/motor in the motor mode being operable to receive electrical power from the main generator and convert the electrical power into mechanical power that is injected into the spool to which the auxiliary generator/motor is coupled.

16. The system of claim 15, further comprising a controller structured and arranged to control operation of the main generator and the auxiliary generator/motor.

17. The system of claim 16, further comprising a power electronics unit coupled with the main generator and with the auxiliary generator/motor, the power electronics unit operable to process the alternating currents from the main generator and auxiliary generator/motor and synthesize an alternating output current at a fixed predetermined frequency for supply to the load.

18. The system of claim 17, wherein the power electronics unit comprises a first rectifier structured and arranged to operate upon the alternating current from the main generator so as to produce a first non-alternating direct current at a non-alternating voltage, a second rectifier structured and arranged to operate upon the alternating current from the auxiliary generator/motor so as to produce a second non-alternating direct current at a non-alternating voltage, and an inverter structured and arranged to operate upon the non-alternating direct currents from the rectifiers so as to synthesize the alternating output current that is supplied to the load.

19. The system of claim 18, wherein the first rectifier is responsive to a current control signal to vary the level of the first non-alternating direct current independently of the alternating current from the main generator, the controller being operable to supply the current control signal to the first rectifier to control the level of the first non-alternating direct current output by the first rectifier and thereby control main generator speed.

20. The system of claim 15, further comprising a heat exchanger arranged to receive the compressed air from the first compressor and exhaust gases from the second turbine, the heat exchanger causing heat transfer from the exhaust gases to the compressed air so as to pre-heat the compressed air prior to combustion in the combustor.

21. The system of claim 15, wherein the second spool includes a second compressor that is mounted on the second shaft and is driven by the second turbine, the second compressor being arranged to compress air and supply the compressed air to the first compressor, which further compresses the air.

22. The system of claim 21, wherein the main generator is coupled with the first spool and the auxiliary generator/motor is coupled with the second spool.

23. The system of claim 22, further comprising an intercooler arranged between the second compressor and the first compressor, the intercooler being operable to cool the compressed air from the second compressor before the compressed air is supplied to the first compressor.

24. The system of claim 22, further comprising a heat exchanger arranged to receive the compressed air from the first compressor and exhaust gases from the second turbine, the heat exchanger causing heat transfer from the exhaust gases to the compressed air so as to pre-heat the compressed air prior to combustion in the combustor.

25. The system of claim 21, wherein the main generator is coupled with the second spool and the auxiliary generator/motor is coupled with the first spool.

26. The system of claim 15, wherein the second turbine comprises a free power turbine.

27. The system of claim 26, wherein the main generator is coupled with the second shaft for the free power turbine and the auxiliary generator/motor is coupled with the first shaft.

28. A system for generating electrical power for supply to a load, comprising:
   a gas turbine engine comprising:
      a first spool including a first shaft, a first compressor mounted on the first shaft, a first turbine mounted on the first shaft, and a catalytic combustor operable to combust or react a mixture of fuel and compressed air from the first compressor to produce hot gases that are expanded in the first turbine to produce mechanical power to drive the first compressor; and
      a second spool including a second shaft and at least a second turbine mounted on the second shaft, the second turbine arranged to receive gases exhausted from the first turbine and expand the gases to produce mechanical power;
   a main generator coupled to one of the first and second spools so as to be rotatably driven thereby, the main generator operable to generate an alternating electrical current for supply to the load;
   an auxiliary generator/motor coupled to the other of the first and second spools, the auxiliary generator/motor selectively operable in either a generation mode or a motor mode, the auxiliary generator/motor in the generation mode being operable to extract mechanical power from the spool to which the auxiliary generator/motor is coupled and generate an alternating electrical current for supply to the load, the auxiliary generator/motor in the motor mode being operable to receive electrical power from a source and convert the electrical power into mechanical power that is injected into the spool to which the auxiliary generator/motor is coupled;
   a controller structured and arranged to control operation of the main generator and the auxiliary generator/motor, the controller being operable to select the mode in which the auxiliary generator/motor operates and to control the auxiliary generator/motor in the selected mode; and
   a sensor operable to measure a variable indicative of combustor inlet temperature, and wherein the controller is connected to said sensor and is operable to control air flow through the first spool in such a manner as to maintain the combustor inlet temperature above a predetermined minimum temperature required for catalytic operation.

29. The system of claim 28, further comprising a heat exchanger arranged to receive the compressed air from the first compressor and exhaust gases from the second turbine, the heat exchanger causing heat transfer from the exhaust gases to the compressed air so as to pre-heat the compressed air prior to combustion in the combustor, and a sensor associated with the heat exchanger operable to measure a variable indicative of a temperature of the exhaust gases entering the heat exchanger, and wherein the controller is connected to said sensor associated with the heat exchanger and is operable to control air flow through the first spool to maintain the temperature of the exhaust gases entering the heat exchanger below a predetermined maximum temperature.

* * * * *